Figure 1:
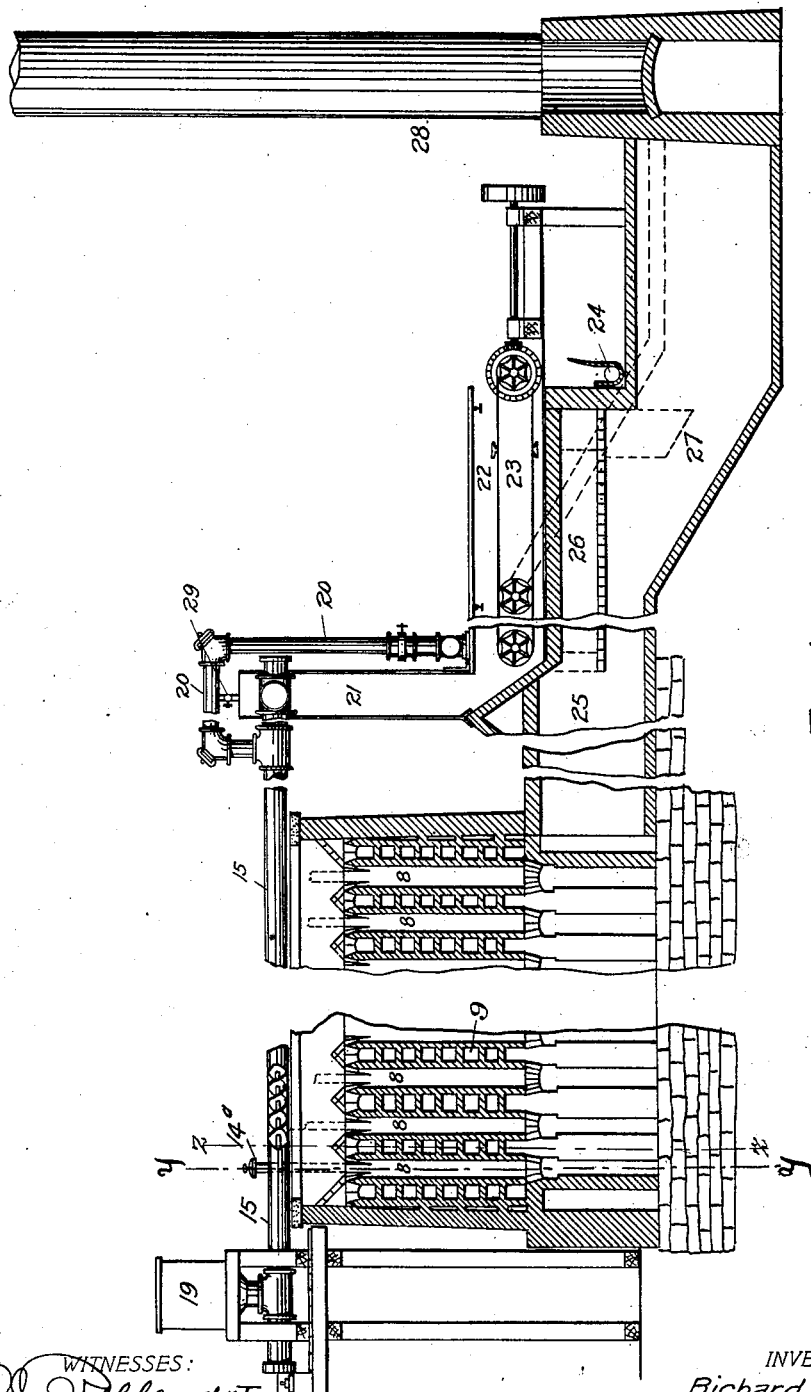

No. 678,296. Patented July 9, 1901.
R. C. HILLS.
PROCESS OF THE MANUFACTURE OF BRIQUET MATERIAL.
(Application filed Dec. 4, 1900.)
(No Model.) 2 Sheets—Sheet 1.

WITNESSES:
INVENTOR.
Richard C. Hills
BY
ATTORNEY.

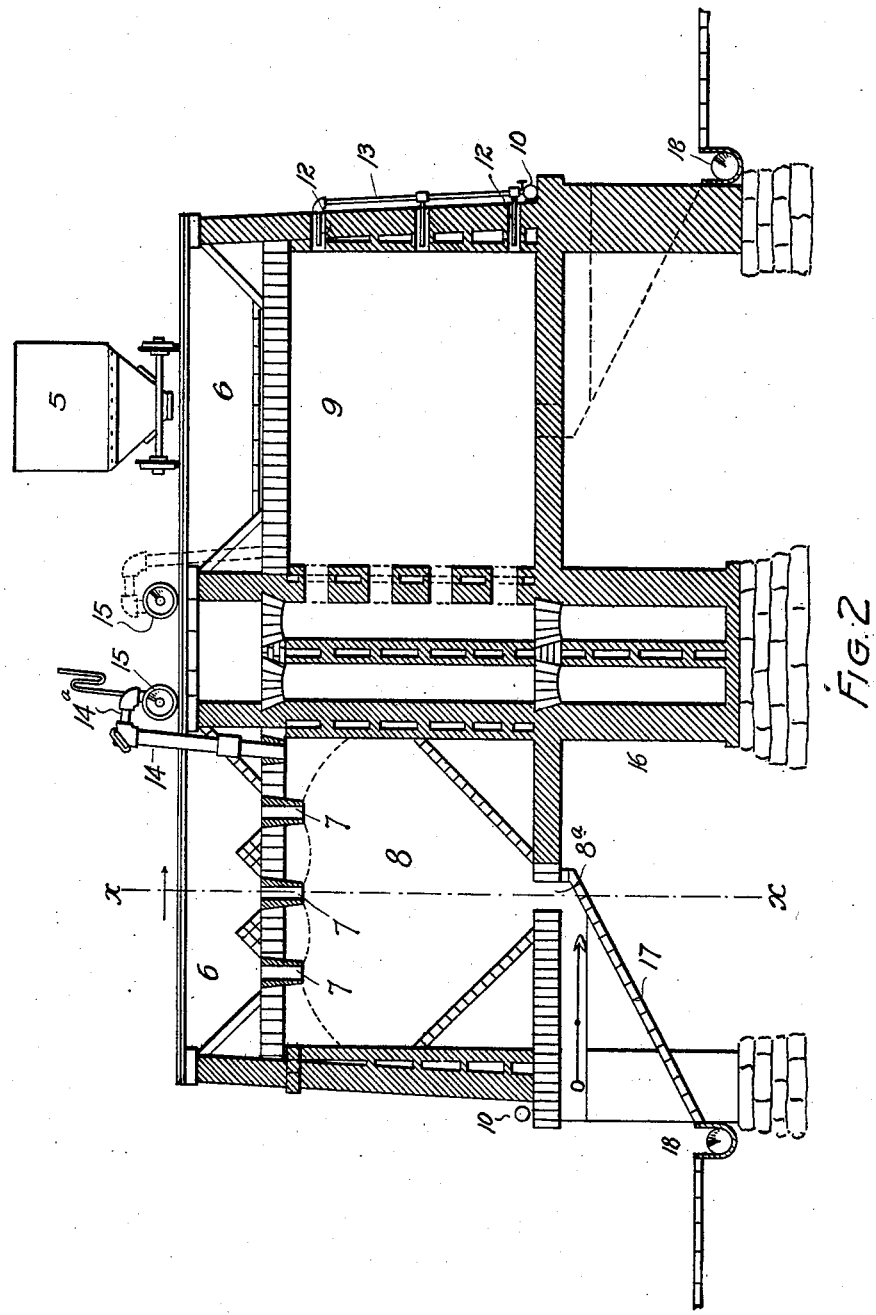

UNITED STATES PATENT OFFICE.

RICHARD C. HILLS, OF DENVER, COLORADO.

PROCESS OF THE MANUFACTURE OF BRIQUET MATERIAL.

SPECIFICATION forming part of Letters Patent No. 678,296, dated July 9, 1901.

Application filed December 4, 1900. Serial No. 38,706. (No specimens.)

*To all whom it may concern:*

Be it known that I, RICHARD C. HILLS, a subject of the Queen of Great Britain, residing at Denver, in the county of Arapahoe and State of Colorado, have invented certain new and useful Improvements in Processes for the Manufacture of Briquet Material; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a process for the manufacture of briquet material or material adapted to be molded into a convenient form of fuel from the different varieties of mineral coal, but intended more especially for the treatment of lignitic coals of high moisture contents in regions where the scarcity or high price of the tar binder ordinarily used in making briquets renders the utilization of the material for fuel purposes difficult, if not impossible. The process, generally speaking, consists of the destructive distillation of the coal or mineral substance containing carbonaceous matter, filtering or passing the vapors of the tarry distillate through the material to be treated, and subsequently heating and digesting the latter to expel the water, more volatile hydrocarbons, and ammonia, and to transform the tarry matter into a pitchy or asphaltic state, in which condition the material is pressed into briquets.

When in continuous operation on a substance like lignite, the material through which the tarry vapors are filtered or scrubbed is the cinder or coke braize that results from the distillation of the lignite in the retort-chambers of an oven or gas-heated furnace. This material is slowly carried forward by a screw conveyer past delivery-pipes, which connect the conveyer-pipe directly with the retort-chambers and serve for the passage of the products of distillation from the said chambers into the said conveyer-pipe. As the material is carried forward the streams of tarry vapor entering from the delivery-pipes are successively encountered and the tar intercepted, the frictional resistance being neutralized by the action of an exhaust fan or blower suitably attached and capable of imparting sufficient pressure to the purely gaseous products of distillation delivered by it to a gas-holder to allow of transmission and distribution through pipes to the combustion-chambers of the oven and steam-boilers or gas-engines used to generate power. Incidentally the ammonia, benzin, and other volatile by-products may be recovered by passing the gaseous products previous to combustion through suitable cooling and condensing devices. During the passage of the material through the conveyer the retort-chambers are constantly supplied with fresh lignite charged in through openings on top, the cinder or braize being taken out at the bottom and with or without crushing carried to the bin, which feeds a screw conveyer, charged into the scrubber-pipe of the conveyer and used as a filter to intercept the tar. Thus the lignite is made to furnish material high in fixed carbon and the tar capable of being converted into a binder suitable for the manufacture of briquets.

In describing the process more in detail reference will be had to the accompanying drawings, in which is illustrated suitable apparatus for carrying out or practicing the process.

In the drawings, Figure 1 is a vertical longitudinal section taken through the apparatus on the line $x$ $x$, Fig. 2. Fig. 2 is a vertical transverse section of Fig. 1, the left half being taken on the line $y$ $y$ or through a retort-chamber, while the right half is taken on the line $z$ $z$ or through a combustion-chamber of the apparatus.

The slack or other disintegrated coal to be employed in the process is discharged from a car 5 into hoppers 6, communicating by feed-ports 7 with retort-chambers 8, located intermediate combustion-chambers 9 of an oven or furnace. The heat which produces the destructive distillation of the coal is supplied by the combustion-chambers. As a result of this distillation, tar, gas, and cinder or coke are produced. The tar in the form of vapor and the gas pass from the retorts through pipes 14, leading upwardly therefrom, and are discharged through elbows 14$^a$ into screw conveyers 15. It will be observed by reference to Fig. 2 that the apparatus is formed double, two series of retorts and combustion-chambers being arranged on opposite sides of a central wall 16, two conveyers 15, two sets of delivery-pipes 14, and other corresponding parts being employed. As the two members of the duplex apparatus are substantially identical, the duplex form being employed to give increased capacity to the apparatus, a description of one member will be sufficient for the purposes of this specification. The cinder from the retorts passes through an opening 8ª in the bottom of each retort and thence down an inclined chute 17 into a conveyer 18, from which it may be carried upwardly and discharged into a bin 19, having a hopper-shaped bottom, through which the cinder passes into the conduit or scrub-pipe forming the shell of the conveyer, which is provided with a screw rotated to carry the material along any desired distance to accomplish the result sought, which is an intimate admixture of the tarry substance with the cinder under treatment. An exhaust-fan or blower (not shown) connected with a pipe 20, leading from the conveyer-pipe near its rear extremity, produces the suction necessary to cause the gas to pass through the substance in the conveyer, while the tarry matter is strained out and retained by the cinder. The gas passes to a gas-holder (not shown) and is conducted under pressure from the gas-holder to main pipes 10 (see Fig. 2) and passes thence by way of branch pipes 13 and burners 12 to the combustion-chambers 9 of the oven or furnace. The blower or exhaust-fan should be located intermediate the pipe 20 and the gas-holder, whereby it exhausts the gas from the conveyers and forces it into the gas-holder under sufficient pressure for delivery to the combustion-chambers. The material under treatment after reaching the rear extremity of the screw conveyer drops through a vertical passage 21 into the drier 22, which consists of a horizontal chamber in which is located an endless conveyer 23, composed of chains carrying drags, which finally discharge the material to a conveyer 24, which carries it to the machine (not shown) for manufacturing or forming it into briquets. The material while passing slowly through the drier is subjected to heat taken from the combustion-chambers of the oven or furnace and carried by the flue 25 to a flue 26, located under the drier. The flue 26 has an outlet by way of a by-pass 27 to the stack 28. The heat acting on the material in the drier dispels the water, more volatile hydrocarbons, and ammonia, whereby the tarry matter is transformed into a pitchy or asphaltic state, rendering it fit for binding the material into briquets. The elements or products dispelled while the material is passing through the drier rise through the passage 21 and enter the pipe 20 through a valve-controlled outlet 29. After reaching the pipe 20 these elements unite with the gas from the conveyer. The ammonia and other volatile by-products which it is desired to save may be recovered, as heretofore specified, from the gas in any suitable manner before the latter is delivered to the combustion-chambers of the oven.

I am aware that for many years briquets have been manufactured from a mixture of coal or coke braize by using the pitchy residue from the refining of tar as a binder; that a patent for a process much similar to the ordinary one was granted in 1881, No. 251,458, and a patent for a process of this kind, No. 580,568, in 1887; but the operation of both of these processes involves the interposition of costly condensing apparatus between the distillation of the tar and its incorporation as a binder, and while the first process requires that the tar shall be first refined the second process requires preliminary pressing into blocks before baking or drying.

The object of the process involved in my present application is to dispense with the condensing feature entirely and with the preliminary pressing into blocks. For the accomplishment of this object advantage is taken of the established fact that the amount of tar that can be extracted from its vapors depends upon the number of contacts, and by drawing or filtering the vapor through the briqueting material while the latter is in motion it is found that the heavier and more desirable tarry products are intercepted and the material is then in a condition for drying without preliminary pressing into bricks.

Having thus described my invention, what I claim is—

A process for manufacturing fuel briquets from coal, anthracite, coke, lignite or the cinder from the distillation of lignitic coals which may be used in the process, consisting of the distillation of coal or lignite, passing the tarry distillate immediately from the coal into and through the moving material intended to be manufactured into briquets, then heating this material to expel objectionable volatile products, and finally pressing it into blocks or briquets.

In testimony whereof I affix my signature in presence of two witnesses.

RICHARD C. HILLS.

Witnesses:
A. J. O'BRIEN,
MARY C. LAMB.